United States Patent [19]
Beall

[11] 3,873,329

[45] Mar. 25, 1975

[54] GLASS-CERAMIC ARTICLE

[75] Inventor: George H. Beall, Big Flats, N.Y.

[73] Assignee: Corning Glass Works, Corning, N.Y.

[22] Filed: July 2, 1973

[21] Appl. No.: 375,724

[52] U.S. Cl.................. 106/39.8, 106/52, 106/54
[51] Int. Cl............................................. C03c 3/04
[58] Field of Search .......... 106/39.6, 39.8, 39.7, 52, 106/54

[56] References Cited
UNITED STATES PATENTS

| | | | |
|---|---|---|---|
| 3,117,881 | 1/1964 | Henry.............................. | 106/39.8 X |
| 3,252,778 | 5/1966 | Goodman et al. ............. | 106/39.8 X |
| 3,647,490 | 3/1972 | Pirooz............................ | 106/39.6 X |

*Primary Examiner*—Winston A. Douglas
*Assistant Examiner*—John F. Niebling
*Attorney, Agent, or Firm*—Clinton S. Janes, Jr.; Clarence R. Patty, Jr.

[57] ABSTRACT

This invention relates to the production of hard, high-modulus glass-ceramic articles having compositions within the $MgO-Al_2O_3-B_2O_3-SiO_2$ field nucleated with a combination of $TiO_2$ and $ZrO_2$ wherein the principal crystal phases are alpha-quartz and sapphirine. Where such articles are contacted with a source of lithium ions at elevated temperatures, an exchange of lithium ions for magnesium ions on a two-$Li^+$-for-one $Mg^{+2}$ basis takes place within the crystal structures resulting in the development of a surface layer wherein the primary crystal phase is a lithium-stuffed beta-quartz solid solution, also sometimes termed beta-eucryptite solid solution. This phenomenon causes the development of compressive stresses within the ion exchanged surface layer as the articles are cooled below the exchange temperature leading to a marked improvement in the mechanical strength of the articles.

4 Claims, No Drawings

GLASS-CERAMIC ARTICLE

A glass-ceramic article is produced through the controlled crystallization in situ of a glass body which is accomplished by means of a carefully-designed heat treatment being applied thereto. In general, the manufacture of glass-ceramic articles commonly contemplates three overall steps. First, a glassforming batch, in which a nucleating agent is normally included, is compounded and melted. Second, the resulting melt is simultaneously cooled rapidly enough to yield a crystal-free glass and an article of a desired configuration shaped therefrom. Third, the glass article is subjected to particular timetemperature heat treatment schedules to cause the glass to crystallize in situ. Usually the preferred practice for carrying out this third step involves two actions. Hence, the glass article is initially heated to a temperature in the vicinity of the annealing point thereof to engender the development of nuclei therein. Subsequently, the temperature is raised (normally above the softening point of the glass) to promote the growth of crystals on the nuclei.

Inasmuch as the crystallization in situ process involves the practically simultaneous growth of crystals on innumerable nuclei distributed throughout the bulk of a glass body, the microstructure of a glass-ceramic article has been demonstrated to consist of relatively uniformly-sized, fine-grained crystals homogeneously dispersed, but randomly oriented, within a residual glassy matrix, the crystal phase conventionally comprising the predominant proportion of the article. Hence, glass-ceramic articles are commonly at least 50 percent by weight crystalline and, frequently, are actually greater than 75 percent by weight crystalline. The very high crystallinity of glass-ceramic articles normally results in such articles exhibiting chemical and physical properties far removed from those of the parent glass. In practice, the characteristics of the glass-ceramic article will usually approximate those of the crystal phases. And, self-evidently, the residual glassy matrix will normally analyze as a materially different composition from that of the parent glass since the constituents making up the crystal phase will have been removed therefrom.

Inasmuch as the production of glass-ceramic bodies has its basis in the crystallization in situ of precursor glass bodies, conventional glass-forming manufacturing processes such as blowing, casting, drawing, pressing, rolling, spinning, etc., can be employed in shaping articles of desired configurations and dimensions. Furthermore, the residual glassy matrix insures that the glass-ceramic article is essentially free from voids and is non-porous.

For a more extensive discussion of the theoretical concepts and practical considerations involved in the production of glass-ceramic articles, reference is hereby made to U.S. Pat. No. 2,920,971, the basic patent in the field of glass-ceramics. That patent describes the glass-ceramic article as being predominantly crystalline, viz., greater than 50 percent by weight crystalline, and explains that the crystal phases developed in glass-ceramic articles are a function of the parent glass composition and the heat treatment parameters to which the parent glass is exposed.

The chemical and physical properties of glasses are well-documented as varying over wide ranges, depending upon composition. Thus, glasses are available exhibiting coefficients of thermal expansion ranging from a slightly negative value up to over $150 \times 10^{-7}/°C$.; the electrical properties can vary from dielectric to semiconducting; and the chemical durability can range from essentially inert to easily water soluble. However, in the area of mechanical strength, glass has been recognized as weak in practice. Thus, whereas glass is extremely strong in the pristine state, this strength is significantly reduced with even very minor surface abuse. In general, the strength of annealed glass, after exposure to conventional service, has been estimated to range only between about 5000–10,000 psi in terms of modulus of rupture.

The presence of crystals within glass-ceramic articles has commonly provided such articles with inherent mechanical strengths of up to twice that of glass. Hence, glass-ceramic articles, wherein the surfaces thereof have been abraded to simulate conventional service abuse, will normally demonstrate modulus of rupture values varying between about 10,000–15,000 psi. This factor has imparted an added measure of utility to such products. Nevertheless, means for enhancing the mechanical strength of glass and glass-ceramic articles have been sought. The thermal tempering of glass articles can yield modulus of rupture values up to about 20,000–25,000 psi but that practice is not feasible for thin-walled articles or complicated shapes. A rather recent development, which has proved effective for both glass and glass-ceramic articles, contemplates a chemical strengthening technique. In each embodiment, the article is contacted with an external source of cations at an elevated temperature whereby ions from the external source migrate into the surface of the article and exchange with ions present in the glass structure or in the crystals of the glass-ceramic article. This exchange leads to the formation of a surface layer with properties differing from those in the bulk material and these differences cause compressive stresses to be set up in the surface layer. Modulus of rupture values of 50,000 psi were very common with individual products approaching and, in rare instances, exceeding 100,000 psi.

The present invention provides glass-ceramic bodies which, as formed, will exhibit very high mechanical strengths and elastic moduli with exceptional hardness and which, when subjected to a particular chemical strengthening process, will demonstrate average modulus of rupture values greater than about 150,000 psi with individual measurements in excess of 250,000 psi.

The instant invention is concerned with glass-ceramic articles which, as formed, will exhibit average modulus of rupture values between about 25,000-60,000 psi, elastic moduli of about $18–22 \times 10^6$ psi, Knoop hardness measurements ($KHN_{100}$) over 800, and coefficients of thermal expansion (25°-300°C.) ranging between about $90–110 \times 10^{-7}/°C$. Such articles are produced through the crystallization in situ of glass bodies consisting essentially, by weight on the oxide basis, of about 10–16% $MgO$, 0.5–3.5% $B_2O_3$, 20–28% $Al_2O_3$, and 44–58% $SiO_2$, with 3–9% $TiO_2$ and 3–7% $ZrO_2$ as nucleating agents, the total $TiO_2 + ZrO_2$ being about 8.0–13 percent. A crystal assemblage comprised predominantly of alpha-quartz and sapphirine ($4MgO·5Al_2O_3·SiO_2$) with, frequently, spinel ($MgO·Al_2O_3$) and minor amounts of such other crystals as rutile ($TiO_2$), cordierite ($2MgO·2Al_2O_3·5SiO_2$), zircon ($ZrSiO_4$), and tetragonal zirconia ($ZrO_2$) or a zirconium titanate is developed wherein the crystals, themselves, are fine-grained and are homogeneously dispersed, but randomly oriented, within a very minor amount of residual glass (normally less than about 25 percent by volume). In broad terms, the crystallization in situ of the original glass body contemplates exposure thereof to temperatures within the range of about 875°–1100°C.

To achieve the most favorable physical properties, the glass compositions will contain only the above-noted constituents within the prescribed ranges. Nevertheless, minor additions of other metal oxides or fluoride to the base batches can be tolerated as melting or forming aids or to specifically influence some physical characteristic of the final product, the total of all such additions generally not exceeding about 3 percent by weight. The presence of the alkali metal oxides, e.g., $Li_2O$, $Na_2O$, and $K_2O$, is desirably avoided since the growth of crystal phases other than those recited above or increased residual glass is hazarded and their effects upon the subsequent chemical strengthening step and the final physical properties exhibited by the article can be adverse. Therefore, the total of those oxides will most preferably not exceed about 3 percent by weight.

The crystallization of the glass article is time and temperature dependent. Hence, in the cooler portions of the 875°–1100°C. range, relatively long exposure times may be required to obtain a highly crystalline article, perhaps 24 hours or even longer; whereas at the upper extreme of the temperature range, exposure times of as little as 15 minutes will generally be sufficient.

In the conventional practice of the invention, the glass melt is simultaneously cooled and shaped and thereafter cooled to about room temperature to permit visual inspection of glass quality. However, this cooling to room temperature is not demanded to achieve good crystallization within the article. It is required, nevertheless, that the melt be cooled to at least within the transformation range thereof before subjecting the body to the proper crystallization heat treatment. The transformation range has been defined as the temperature at which a liquid melt is considered to have been transformed into an amorphous solid. Generally, it has been that this transformation range lies in the vicinity of the annealing point of a glass.

The preferred crystallization practice contemplates two steps: first, the glass article is heated to a temperature somewhat above the transformation range of the glass, i.e., a temperature between 750°–850°C. and maintained within that range for a sufficient length of time to achieve good nucleation; and, thereafter, the nucleated article is heated to a temperature within the crystallization range for a sufficient period of time to complete crystal growth. This preferred practice involves a nucleation period of about 1–6 hours and a crystallization hold of about 1–8 hours.

Whereas the two-step heat treatment schedule constitutes the preferred method, it must be appreciated that numerous modifications in the crystallization practice are possible, the sole mandatory parameter which must be observed is a crystallization temperature between about 875°–1100°C.

As was noted above, the rate of crystal growth is a function of temperature. Thus, at temperatures slightly above the transformation range, crystal growth is quite slow and the glass body is subject to deformation. In view of that fact, the rate at which the glass body is heated at temperatures above the transformation range must not be so rapid that there is inadequate time for a growth of crystals sufficient to provide support for the body. Heating rates of 10°C./minute and greater can be successfully employed where some physical support for the parent glass article is provided to inhibit deformation. However, very little slumping or deformation will be observed over the whole range of compositions operable in the instant invention where heating rates not exceeding about 3°–5°C./minute are utilized. Such rates, therefore, comprise the preferred practice. The preferred two-step heat treatment procedure also aids in minimizing body deformation since a substantial hold within the nucleation range assures more rapid and uniform subsequent crystallization.

Table I records compositions of thermally crystallizable glasses, expressed in weight percent on the oxide basis, which, when subjected to the appropriate crystallization practice of this invention, can be crystallized in situ to glass-ceramic articles containing relatively uniformly-sized, fine-grained crystals of alpha-quartz and sapphirine, with, commonly, spinel and other minor phases randomly oriented, but homogeneously dispersed, within a glassy matrix. The actual ingredients of the glass batches can be any materials, either oxides or other compounds, which, on being melted together, are transformed into the desired oxide compositions in the proper proportions. The batch constituents were compounded, ballmilled together to assist in obtaining a homogeneous melt, and then melted in open platinum crucibles for about 16 hours at a temperature ranging between about 1500°–1650°C. Subsequently, the molten glass was poured onto a steel plate to chill a circular glass patty about 0.5 inch thick and that patty immediately transferred to an annealer operating at about 750°C. Where desirable, a fining agent such as $As_2O_3$ or $Sb_2O_3$ can be useful in amounts up to 1–2%.

TABLE I

|  | 1 | 2 | 3 | 4 | 5 | 6 | 7 | 8 |
|---|---|---|---|---|---|---|---|---|
| $SiO_2$ | 49.1% | 49.0% | 48.6% | 50.3% | 49.2% | 52.4% | 56.7% | 52.9% |
| $Al_2O_3$ | 24.3 | 24.8 | 24.7 | 24.0 | 24.9 | 22.8 | 20.9 | 23.0 |
| MgO | 13.6 | 12.4 | 12.3 | 11.6 | 12.4 | 11.6 | 10.9 | 11.7 |
| $B_2O_3$ | 1.5 | 1.8 | 2.5 | 3.1 | 2.5 | 2.5 | 2.5 | 2.5 |
| $TiO_2$ | 7.1 | 7.5 | 7.5 | 7.1 | 4.4 | 3.6 | 4.5 | 5.4 |
| $ZrO_2$ | 3.6 | 3.6 | 3.5 | 3.6 | 6.2 | 6.2 | 3.6 | 3.6 |
| $As_2O_3$ | 0.8 | 0.9 | 0.9 | 0.3 | 0.4 | 0.9 | 0.9 | 0.9 |

After annealing to room temperature, the glass patties from Table I were examined for glass quality, test specimens cut therefrom, and those specimens placed into an electrically fired furnace where each was exposed to the heat treatment schedules set out in Table II. Specimens were cut from the patties such that a pristine surface, which could affect subsequent strength measurements, would not be present. In each case, the specimen was heated at a rate of about 5°C./minute to the dwell temperature recorded. Upon completion of the crystallization schedule, the electric current to the furnace was cut off and the articles cooled to room temperature within the furnace. Such practice has been termed "cooling at furnace rate." It has been estimated that this rate of cooling averages about 3°–5°C./minute. More rapid rates of cooling are possible, particularly in thin-walled articles, but the above practice has been conventionally employed out of simple convenience.

Table II also sets forth a visual description of the product and the crystal phases present as identified through X-ray diffracton analysis. Elastic modulus (× $10^6$psi), Knoop hardness ($KHN_{100}$), and coefficient of thermal expansion over the temperature range of 25°–300°C. (× $10^{-7}$/°C.) are reported where determined in the conventional manner on individual examples.

The high strength of the crystallized articles, measured in terms of modulus of rupture, is believed due to compressive stresses set up in the surface of the articles resulting from the phase transformations taking place in the surface and interior portions of the articles. Hence, a self-strengthening mechanism is believed to be at work wherein there is a greater volume shrinkage in the interior portion than in the surface layer. This contraction of the interior portion of the article is instrumental in causing the compressive stresses in the surface. The overall shrinkage demonstrated by articles of this invention will generally vary between about 3–5%.

That the high mechanical strength exhibited by the crystallized articles is due to an integral surface com-

TABLE II

| Example No. | Heat Treatment | Visual Description | Crystal Phases | Elastic Modulus | Knoop Hardness | Exp. Coeff. | Modulus of Rupture |
|---|---|---|---|---|---|---|---|
| 1 | 800°C. for 2 hours 940°C. for 2 hours | Gray, translucent very fine-grained | Alpha-quartz, spinel, sapphirine, rutile, tetragonal $ZrO_2$ | 18.9 | 836 | 95 | 59,000 |
| 1 | 800°C. for 2 hours 990°C. for 6 hours | White, opaque, very fine-grained | Alpha-quartz, spinel, sapphirine, rutile, zircon, tetragonal $ZrO_2$ | 21.7 | 1035 | 102 | 35,000 |
| 1 | 800°C. for 6 hours 990°C. for 2 hours | White, opaque, very fine-grained | Alpha-quartz, spinel, sapphirine, rutile, zircon, tetragonal $ZrO_2$ | 21.0 | 1011 | 106 | 40,000 |
| 1 | 820°C. for 4 hours 965°C. for 4 hours | White, opaque, very fine-grained | Alpha-quartz, spinel, sapphirine, rutile, zircon, tetragonal $ZrO_2$ | 21.2 | 1031 | 104 | 36,000 |
| 1 | 840°C. for 6 hours 940°C. for 2 hours | Gray, opaque, very fine-grained | Alpha-quartz, spinel, sapphirine, rutile, tetragonal $ZrO_2$ | 19.8 | 806 | 104 | 59,000 |
| 2 | 800°C. for 4 hours 960°C. for 4 hours | White, opaque, very fine-grained | Alpha-quartz, spinel, sapphirine, rutile, tetragonal $ZrO_2$ | 21.4 | 1000 | 100 | 40,000 |
| 2 | 800°C. for 4 hours 975°C. for 4 hours | White, opaque, very fine-grained | Alpha-quartz, spinel, sapphirine, rutile, tetragonal $ZrO_2$ | | 838 | | 38,000 |
| 2 | 820°C. for 4 hours 965°C. for 4 hours | White, opaque, very fine-grained | Alpha-quartz, spinel, sapphirine, rutile, tetragonal $ZrO_2$ | | 1010 | | 42,000 |
| 2 | 820°C. for 4 hours 980°C. for 4 hours | White, opaque, very fine-grained | Alpha-quartz, spinel, sapphirine, rutile, tetragonal $ZrO_2$ | | | 100 | 40,000 |
| 3 | 810°C. for 4 hours 975°C. for 4 hours | White, opaque, very fine-grained | Alpha-quartz, spinel, sapphirine, rutile, tetragonal $ZrO_2$ | 21 | | 103 | 50,000 |
| 4 | 800°C. for 4 hours 900°C. for 4 hours | White, opaque, very fine-grained | Alpha-quartz, spinel, sapphirine, rutile, tetragonal $ZrO_2$ | | | 100 | 45,000 |
| 5 | 820°C. for 4 hours 990°C. for 4 hours | White, opaque, very fine-grained | Alpha-quartz, spinel, sapphirine, rutile, tetragonal $ZrO_2$ | 18.2 | 925 | | 35,000 |
| 6 | 800°C. for 4 hours 1000°C. for 4 hours | White, opaque, very fine-grained | Alpha-quartz, spinel, sapphirine, rutile, tetragonal $ZrO_2$ | | | 98 | 35,000 |
| 7 | 810°C. for 4 hours 990°C. for 4 hours | White, opaque, very fine-grained | Alpha-quartz, spinel, sapphirine, rutile, tetragonal $ZrO_2$ | | | 100 | 30,000 |
| 8 | 810°C. for 4 hours 990°C. for 4 hours | White, opaque, very fine-grained | Alpha-quartz, spinel, sapphirine, rutile, tetragonal $ZrO_2$ | | | | 50,000 |

Table II illustrates the range of physical properties which the glass-ceramic products of the present invention can exhibit as formed as well as the internal microstructure and crystal phases present determining those characteristics. The articles are commonly very highly crystalline, i.e., generally greater than 75 percent by volume crystalline, and, in frequent instances, virtually 100 percent crystalline. The crystals, themselves, are very fine-grained; essentially all being smaller than 5 microns in diameter and the vast bulk thereof being less than 1 micron in diameter.

pression layer developed therein during crystallization is believed to be evidenced by the fact that, when the surface of the article is ground away to a substantial depth, the modulus of rupture of the remaining body will frequently measure no more than about 15,000 psi.

The extreme surface hardness exhibited by these articles is believed to be the result of the growth of very hard and dense phases which are responsible for the shrinkage occurring during the crystallization step. The Knoop hardness measurements ($KHN_{100}$) in excess of 800 and, in many instances greater than 1000, are far superior to those commonly demonstrated by glass-ceramic articles, as is illustrated in a measurement of 698 for Corning Code 9606 and 703 for Corning Code 9608, two commercially-marketed glass-ceramic products.

The above-recited composition ranges are vital not only for securing the desired initially-strong, glass-ceramic articles but also to provide basis for the extraordinarily strong bodies which can be produced via the chemical strengthening technique. Hence, the presence of $SiO_2$ in amounts greater than 58 percent and/or the inclusion of MgO in excess of 16 percent leads to the development of cordierite ($2MgO \cdot 2Al_2O_3 \cdot 5SiO_2$) which exhibits a low coefficient of thermal expansion rather than the desired alpha-quartz-sapphirine crystal assemblage. Furthermore, application of the chemical strengthening process to glass-ceramic articles wherein cordierite is a principal or predominant crystal phase customarily leads to a minor increase in strength at best. A minimum content of about 44% $SiO_2$ assures crystal-glass stability, i.e., forestalls devitrification of the melt during cooling. The $Al_2O_3$ content must be maintained at a level no higher than about 28% to avoid liquidus and other melting and forming problems. The addition of $B_2O_3$ is required to improve glass stability, i.e., to inhibit devitrification during forming and cooling, and to lower the liquidus. Nevertheless, the presence of more than about 3.5 percent $B_2O_3$ adversely affects the refractoriness and chemical durability of the articles along with the ability of the article to be strengthened through a subsequent ion exchange reaction. Nucleation of these glass compositions with $TiO_2$ alone results in the development of unwanted cordierite whereas $ZrO_2$ nucleates spinel, sapphirine, and alpha-quartz, but not cordierite. Unfortunately, more than about 7% $ZrO_2$ may lead to melting and forming problems (high liquidus). Therefore, a combination of these two agents is demanded to achieve highly crystalline, fine-grained crystalline articles. Sufficient $ZrO_2$ is substituted for $TiO_2$ to stabilize the formation of the alpha-quartz-sapphirine assemblage against cordierite over a significant temperature range of crystallization schedules.

U.S. Pat. No. 3,585,054 discloses the chemical strengthening of glass-ceramic articles having compositions within the $MgO-Al_2O_3-SiO_2$ field wherein the principal crystal phase is selected from the group of cordierite, enstatite ($MgO \cdot SiO_2$), spinel, stuffed beta-quartz, and alpha-quartz. The strengthening procedure involved contacting the surface of the article with a source of $Li^+$ ions at a temperature between about 900°–1050°C. to cause the $Li^+$ ions to migrate into the surface and exchange with $Mg^{+2}$ ions in the crystals present. This exchange contemplated the replacement of one $Mg^{+2}$ ion with 2 $Li^+$ ions and led to the transformation of the MgO-containing crystals to crystals of beta-eucryptite or beta-spodumene solid solutions.

As is explained in that patent, beta-eucryptite is a crystal in the trapezohedral class of the hexagonal system with the nominal formula $Li_2O \cdot Al_2O_3 \cdot 2SiO_2$. However, in glass-ceramic articles the crystal composition does not strictly conform to the nominal formula of the naturally-occurring crystal but, instead, is more in the nature of a solid solution corresponding generally to the formula $Li_2O \cdot Al_2O_3 \cdot nSiO_2$ where "$n$" can vary between 2–7 or even higher depending upon the $SiO_2$ content of the original glass. Nevertheless, the characteristic geometric pattern of the crystal, as shown by X-ray diffraction analysis indicates the trapezohedral class of the hexagonal system.

Beta-spodumene is a crystal in the trapezohedral class of the tetragonal system having the classical formula $Li_2O \cdot Al_2O_3 \cdot 4SiO_2$. However, like beta-eucryptite, the beta-spodumene crystals in glass-ceramic articles appear to be a solid solution $Li_2O \cdot Al_2O_3 \cdot nSiO_2$ where "$n$" can range from about 3–10. X-ray diffraction studies have demonstrated that the characteristic geometric pattern of the crystals can be recognized throughout the range of solid solution. Hence, where the crystals are classifiable in the hexagonal system they are deemed to be beta-eucryptite solid solutions as contrasted with crystals in the tetragonal system which are categorized as beta-spodumene solid solutions.

Where the oxide stoichiometry in the crystal is such that the "$n$" ranges between about 2-3.5, a stable beta-eucryptite solid solution crystal will generally be observed. At "$n$" values above about 3.5, the stable crystal form normally appears to be of the beta-spodumene type.

As has been observed above, the exceptionally high strengths exhibited by the glass-ceramic articles of the present invention after the chemical strengthening process relate to the presence of alpha-quartz, sapphirine, and, frequently, spinel as the principal crystal phases therein. Sapphirine and spinel demonstrate high coefficients of thermal expansion and are rich in the exchangeable ion $Mg^{+2}$. Furthermore, those crystals contain nearly equal moles of MgO and $Al_2O_3$, thereby insuring a modifier-to-alumina ratio close to 1:1 which is necessary for producing beta-eucryptite solid solution within the surface of the glass-ceramic after the $2Li^+$-for-$Mg^{+2}$ ion exchange. Beta-eucryptite solid solution (also referred to as Li-stuffed beta-quartz solid solution) exhibits a very low coefficient of thermal expansion. The silica component of the glass-ceramic body is desirably present in the form of trigonal alpha-quartz, the polymorph demonstrating a high coefficient of thermal expansion, which, at the temperatures that the ion exchange reaction is undertaken (about 825°–1050°C.), is present in the hexagonal beta-quartz form.

Because of the isostructural nature of beta-quartz and beta-eucryptite, a gradational merging therebetween with strong bonding develops during the ion exchange reaction. Therefore, the body containing quartz as a major phase along with spinel and sapphirine and the exchanged surface consisting of Li-stuffed beta-quartz (beta-eucryptite) allows mutual solid solution. In order to promote the surface development of beta-eucryptite and not beta-spodumene during ion exchange (beta-spodumene forms sharp and commonly weak interfaces with the quartz-rich interior portion of the body), the composition of the glass-ceramic was maintained below the $Si_2O_4$:$MgAl_2O_4$ mole ratio required to form eucryptite, viz., about 3:2. $Si_2O_4$:$MgAl_2O_4$ mole ratios of less than about 1:1 are undesirable for reasons of glass stability.

Table III illustrates the very high mechanical strengths which have been measured on bar and cane samples after the ion exchange reaction. Table III also records the particular crystallization schedule employed to produce the glass-ceramic body. Commonly, the samples were exposed briefly to a temperature in the neighborhood of the operating temperature of the

TABLE III

| Example No. | Crystallization Treatment | Salt Bath and Treatment | Sample Configuration | Modulus of Rupture |
|---|---|---|---|---|
| 1 | 800°C. for 2 hours<br>940°C. for 2 hours | 100% $Li_2SO_4$<br>910°C. for 48 hours | ⅛" × 178 " × 3" bar | 176,000 psi |
| 1 | 800°C. for 2 hours<br>990°C. for 6 hours | 100% $Li_2SO_4$<br>910°C. for 48 hours | ⅛" × ½" × 3" bar | 171,000 psi |
| 1 | 800°C. for 6 hours<br>990°C. for 2 hours | 100% $Li_2SO_4$<br>910°C. for 48 hours | ⅛" × ½ × 3" bar | 182,000 psi |
| 1 | 840°C. for 6 hours<br>940°C. for 2 hours | 100% $Li_2SO_4$<br>910°C. for 48 hours | ⅛" × ½" × 3" bar | 162,000 psi |
| 1 | 820°C. for 4 hours<br>965°C. for 4 hours | 100% $Li_2SO_4$<br>910°C. for 48 hours | ⅛" × ½" × 3" bar | 189,000 psi |
| 2 | 800°C. for 4 hours<br>960°C. for 4 hours | 90% $Li_2SO_4$, 10% $K_2SO_4$<br>850°C. for 7.5 hours | ¼" × 4" cane | 228,000 psi |
| 2 | 820°C. for 4 hours<br>1030°C. for 4 hours | 90% $Li_2SO_4$, 10% $K_2SO_4$<br>900°C. for 6 hours | ¼" × 4" cane | 163,000 psi |
| 2 | 820°C. for 4 hours<br>960°C. for 4 hours | 90% $Li_2SO_4$, 10% $K_2SO_4$<br>825°C. for 72 hours | ¼" × 4" cane | 150,000 psi |
| 3 | 810°C. for 4 hours<br>975°C. for 4 hours | 90% $Li_2SO_4$, 10% $K_2SO_4$<br>850°C. for 7.5 hours | ⅛" × ½" × 3" bar | 180,000 psi |
| 4 | 800°C. for 4 hours<br>900°C. for 4 hours | 90% $Li_2SO_4$, 10% $K_2SO_4$<br>850°C. for 8 hours | ⅛" × ½ " × 3" bar | 150,000 psi |
| 5 | 820°C. for 4 hours<br>990°C. for 4 hours | 90% $Li_2SO_4$, 10% $K_2SO_4$<br>850°C. for 8 hours | ⅛" × 1" × 3" bar | 162,000 psi |
| 6 | 800°C. for 4 hours<br>1000°C. for 4 hours | 90% $Li_2SO_4$, 10% $K_2SO_4$<br>950°C. for 8 hours | ⅛" × ½" × 3" bar | 175,000 psi |
| 7 | 810°C. for 4 hours<br>990°C. for 4 hours | 90% $Li_2SO_4$, 10% $K_2SO_4$<br>850°C. for 8 hours | ⅛" × ½" × 3" bar | 155,000 psi |
| 8 | 810°C. for 4 hours<br>990°C. for 4 hours | 90% $Li_2SO_4$, 10% $K_2SO_4$<br>850°C. for 8 hours | ⅛" × ½" × 3" bar | 160,000 psi | salt bath before being plunged therein to relieve the hazard of thermal breakage. The immersion time required to impart high strength is directly related to the temperature employed in the ion exchange reaction. Thus, the ion exchange reaction follows the law of diffusion, i.e., the rate of the exchange reaction is proportional to the square root of time at constant temperature.

In general, the final or practical strength of a glass-ceramic article is that which is exhibited after the article has been subjected to some surface abuse. Hence, in the vast majority of applications to which a glass-ceramic article will be utilized, some surface abuse thereto will be encountered. Therefore, it is apparent that the ion exchange reaction must be permitted to extend to a sufficient depth within the article such that the scratches, bruises, and pits resulting from general use will not penetrate through the exchanged depth and thus, in essence, return the article to the strength it possessed prior to the ion exchange reaction. Therefore, an ion exchanged layer having a depth of at least about 0.001 inch has been deemed necessary to insure an enhancement in strength which can be enjoyed after the article has undergone a modicum of surface abuse. This strength demonstrated after surface abuse, representing a practical measure of strength improvement, has been called abraded strength. In the articles of the present invention, immersion times of eight hours will commonly produce abraded strengths of over about 150,000 psi even at the cooler extreme of the heating range.

In the treatments reported in Table III, molten $Li_2SO_4$ constituted the source of $Li^+$ ions for the exchange reaction. It will be recognized, of course, that other lithium compounds can be employed which are fluid at the exchange temperatures employed. $K_2SO_4$, $KHSO_2$, and other potassium salts can be included with the $Li_2SO_4$. The comparatively slow mobility and the much greater size of the $K^+$ ions act to assure that the $2Li^+$-for-$Mg^+_2$ ion exchange reaction is not adversely affected and the potassium salts demonstrate an advantageous fluxing effect, i.e., the combination of $Li^+$ + $K^+$ salts will be fluid at a lower temperature than the $Li^+$ salts alone.

X-ray diffraction analyses of the exchanged surface layers have identified beta-eucryptite solid solution (Li-stuffed beta-quartz solid solution) to be the primary crystal phase. The presence of those crystals gives rise to a unitary body having an integral surface layer demonstrating a much lower coefficient of thermal expansion than the interior parent glass-ceramic material. It is this differential in thermal expansion which imparts the startling improvement in mechanical strength to the products when the articles are cooled.

I claim:

1. A glass-ceramic article exhibiting a modulus of rupture value as formed between about 25,000–60,000 psi, a Knoop hardness measurement ($KHN_{100}$) greater than 800, and a coefficient of thermal expansion (25°–300°C.) between about 90–110 × $10^{-7}$/°C. consisting predominantly of alpha-quartz and sapphirine homogeneously dispersed within a glassy matrix, the total crystallinity comprising at least 75 percent of the glass-ceramic article and being produced through the crystallization in situ of a glass article consisting essentially, by weight on the oxide basis, of about 10–16 percent MgO, 0.5–3.5% $B_2O_3$, 20–28 percent $Al_2O_3$, 44–58 percent $SiO_2$, 3–9% $TiO_2$, and 3–7% $ZrO_2$, the total $TiO_2$ + $ZrO_2$ being about 8–13%.

2. A glass-ceramic article according to claim 1 wherein the mole ratio $Si_2O_4$:$MgAl_2O_4$ is below about 3:2.

3. A glass-ceramic article according to claim 2 wherein the mole ratio $Si_2O_4$:$MgAl_2O_4$ is greater than about 1:1.

4. A glass-ceramic article according to claim 1 wherein the sum of MgO, $B_2O_3$, $Al_2O_3$, $SiO_2$, $TiO_2$, and $ZrO_2$ constitutes about 97 percent by weight of the total composition.

* * * * *